Figure 3:
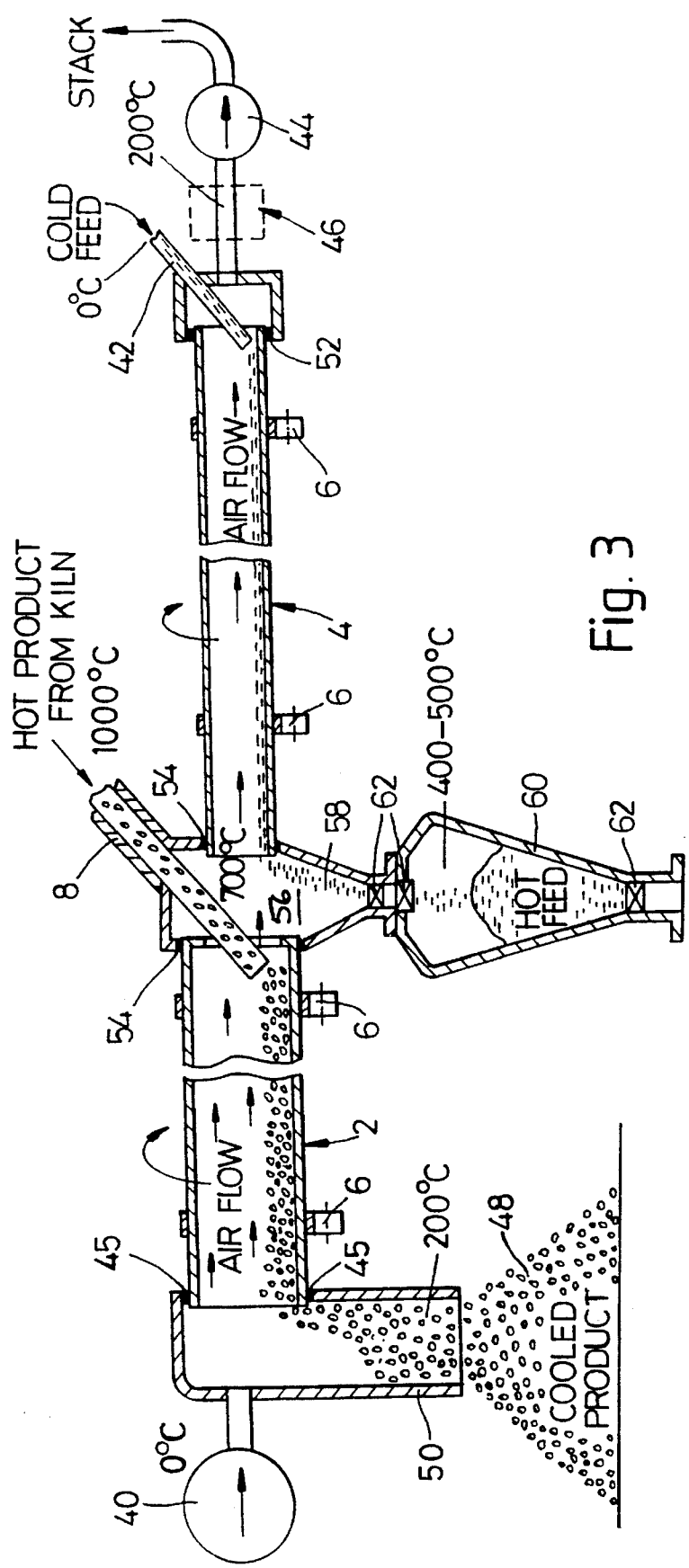

United States Patent [19]
Kyffin

[11] Patent Number: 5,482,458
[45] Date of Patent: Jan. 9, 1996

[54] HEAT TREATMENT OF EXPANSIBLE MATERIALS TO FORM LIGHTWEIGHT AGGREGATE

[76] Inventor: Robin A. Kyffin, Efail Uchaf, Golan, Porthmadog, Gwynedd, Great Britain, LL51 9YU

[21] Appl. No.: 244,046

[22] PCT Filed: Nov. 26, 1992

[86] PCT No.: PCT/GB92/02188

§ 371 Date: May 23, 1994

§ 102(e) Date: May 23, 1994

[87] PCT Pub. No.: WO93/11084

PCT Pub. Date: Jun. 10, 1993

[30] Foreign Application Priority Data

Nov. 29, 1991 [GB] United Kingdom ............... 9125423
Jul. 9, 1992 [GB] United Kingdom ............... 9214642

[51] Int. Cl.⁶ ................................................. F27B 15/00
[52] U.S. Cl. ........................ 432/14; 432/103; 432/105; 432/106; 432/111; 432/179; 432/180; 432/181
[58] Field of Search ..................................... 432/105, 106, 432/103, 111, 179, 180, 181, 14

[56] References Cited

U.S. PATENT DOCUMENTS

| | | | |
|---|---|---|---|
| 3,813,210 | 5/1974 | Miskolczy et al. | 432/15 |
| 4,427,376 | 1/1984 | Etnyre et al. | 432/105 |
| 4,741,694 | 5/1988 | Mason et al. | 432/14 |
| 4,943,231 | 7/1990 | Jenkins et al. | 432/215 |
| 5,073,107 | 12/1991 | Lask | 432/103 |
| 5,102,330 | 4/1992 | Ho | 432/143 |

FOREIGN PATENT DOCUMENTS

| | | |
|---|---|---|
| 451648A2 | 10/1991 | European Pat. Off. . |
| 253049 | 3/1926 | United Kingdom . |
| 420560 | 1/1934 | United Kingdom . |
| 611800 | 11/1948 | United Kingdom . |
| 673484 | 6/1952 | United Kingdom . |
| 676338 | 7/1952 | United Kingdom . |
| 786500 | 11/1957 | United Kingdom . |
| 1022825 | 3/1966 | United Kingdom . |
| 1089448 | 11/1967 | United Kingdom . |

*Primary Examiner*—Henry A. Bennet
*Assistant Examiner*—Siddharth Ohri
*Attorney, Agent, or Firm*—Dennison, Meserole, Pollack & Scheiner

[57] ABSTRACT

A rotary kiln (10) is employed which is inclined downwardly from its charge end (12) to its discharge end (14) and has a maximum length to breadth ratio of 5:1. The interior space of the kiln (10) is heated by means of at least one burner (B1, B2) directed into the kiln from one end thereof to a substantially constant elevated process temperature. Material is fed into the kiln (10) so that it occupies a maximum of 10% of the cross-sectional area of the internal space of the kiln (10) at the charge end (12). Upon entering the kiln the material is subjected almost immediately to the required process temperature. As it moves along the bottom of the kiln (10) from the charge to the discharge end (14), heat transfer to the material is primarily by radiation from the combustion space and from the lining of the kiln (10).

14 Claims, 2 Drawing Sheets

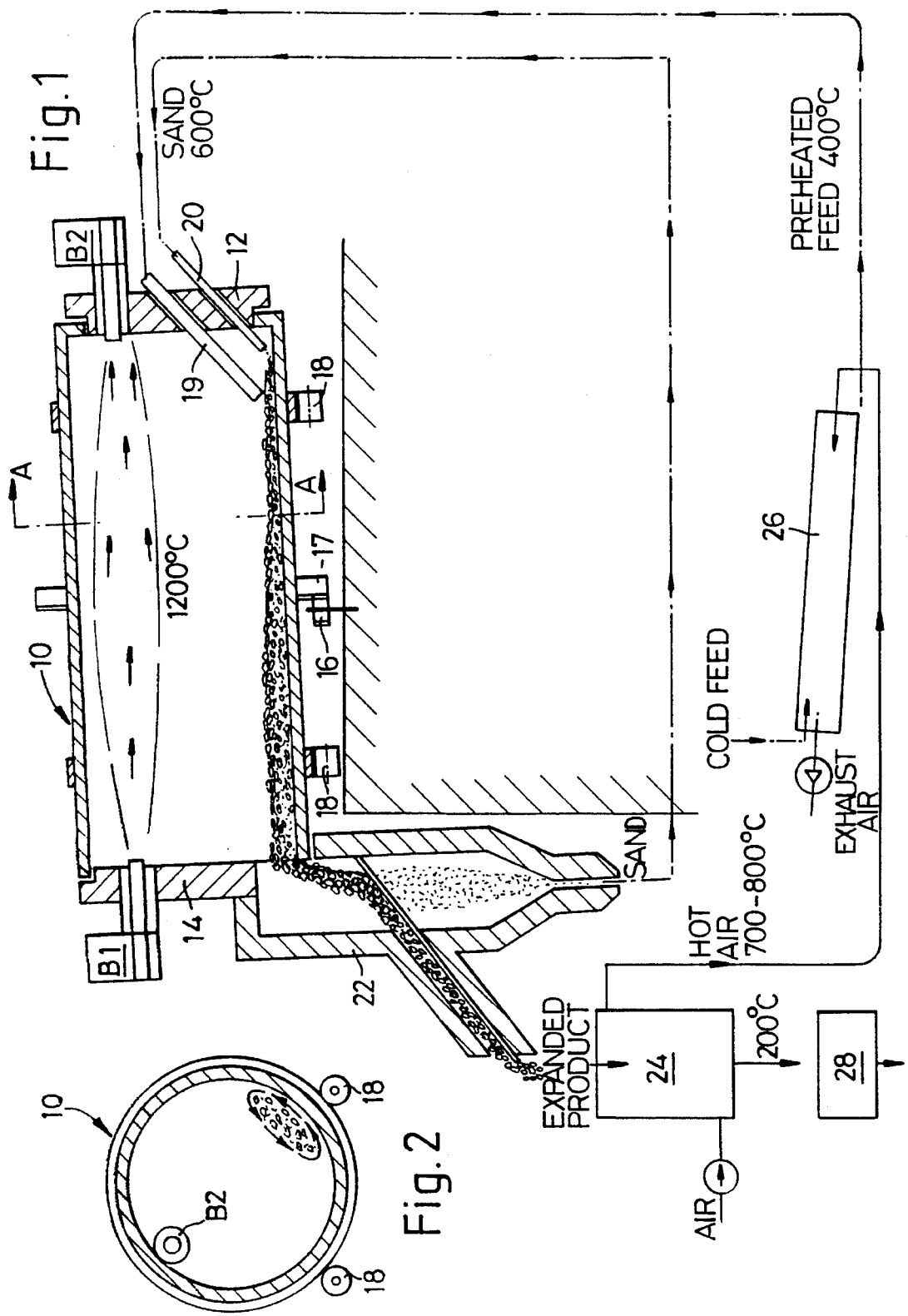

HEAT TREATMENT OF EXPANSIBLE MATERIALS TO FORM LIGHTWEIGHT AGGREGATE

There is considerable demand for lightweight aggregate for use by the construction industry in lightweight aggregate concretes. Such concretes are used in the form of building blocks, precast components such as panels, beams and roofing slabs, and in many other applications where lightness coupled with sufficient strength and low thermal conductivity are important. There are also applications where the aggregates can be used for insulation alone for example as space infill below suspended ground floors, fillings for hollow cavities and so on. Them are yet other uses, in horticulture for instance, where lightweight aggregates are used in composts and as a growing media in hydroponic cultivation.

It is well known that lightweight aggregates can be produced by subjecting certain suitable natural materials, such as some clays, shales and slates, to heat treatment at elevated temperatures to bring about their expansion. Where such expansion is possible, the material to be expanded usually has to be in particulate form as slate or shale chippings, or as pellets made from finely ground clay, slate or shale.

In this invention much consideration has been given to the physical/chemical mechanism whereby materials are expanded and its aim is to provide as far as practicable conditions whereby maximum expansion can be achieved. For expansion to take place the material has to be heated to the point of incipient fusion. At these high temperatures the material becomes plastic and impervious and the gases that are then produced within the material are prevented from escaping. This results in the formation of a myriad of small gas pockets which cause the plastic material to expand and on cooling the porous structure remains within the solidified material. Some gases are evolved within the material at temperatures substantially lower than incipient fusion and a prolonged period of heating to incipient fusion allows these gases to escape uninhibited. It is a teaching of this invention that the material to be expanded should be heated rapidly to incipient fusion, and that it should only be held at this expansion temperature for a time sufficient for full expansion to take place as unnecessary exposure at an elevated temperature can lead to deterioration and a weakened structure.

A proportion of expansion gases, mainly steam from the water of crystallisation of the mineral constituents are evolved at comparatively low temperatures, below 500° C. Thus preheating the material up to say 500° C. prior to the rapid heating process will detract to a degree from the expansion obtained, but this may be desireable in the interests of fuel economy where such preheating can be effected by using waste heat which would otherwise pass out of the system.

Existing commercial processes for producing expanded lightweight aggregate from natural materials have centred principally on two methods of heat treatment, namely using a sinter strand or travelling grate, or using a rotary kiln. Both methods involve heating large quantities of material to elevated temperatures comparatively slowly.

To put this invention into perspective it is necessary to consider existing rotary kiln practice. The rotary kiln consists of a tubular vessel, lined with refractory and insulating material, which can rotate about its longitudinal axis. The kiln is inclined to the horizontal, e.g. by up to 10 degrees, so that when it is rotating any particulate or other material fed into it at its upper end will gradually progress down the kiln until it is discharged at its lower end. Heat is supplied to the discharge end by burners firing directly up the kiln or perhaps by glancing the flames on to the walls or the roof of the kiln. Transit time for material to pass through the kiln is governed by the speed of rotation and the angle of inclination. Material travels in countercurrent against the direction of flow of combustion gases. There is a substantial temperature gradient along the length of the kiln such that at the discharge end the temperature attained is the fusion temperature of the material (say 1200° C.) whilst at the feed end the temperature may be in the range of 300° C.–600° C. Heat transfer along the kiln length is principally effected from gaseous combustion products to the material and baffle means may be provided within the kiln to assist heat transfer by tumbling the material in the gas stream. Near to the discharge end, however, heat transfer to the material is also effected by direct flame impingement and by radiation from the kiln walls. Thermal efficiency in terms of heat supplied to heat transferred successfully to the material can only be further improved by lengthening the kiln and this is limited by capital cost and practical considerations. Generally speaking the configuration economically considered sensible to construct involves a length to diameter ratio of about 15 to 1. In such commercial kilns the residence time of material within the kiln is usually anything between 30 and 90 minutes with many tons of material under treatment within the kiln.

Having regard to the above, the conventional rotary kiln suffers from the following inherent disadvantages:

i) Poor thermal efficiency due to large surface radiation and other losses associated with the long length of the kiln, and combustion products leaving the kiln at too high a temperature at the feed end. With regard to the second, it is impractical and too expensive in terms of capital cost to lengthen the kiln to improve matters.

ii) The heating of the material to incipient fusion is too slow resulting in loss of expansion potential.

iii) Capital cost is very high due to the sheer size of plant even with the normally accepted sizes (length to diameter ratio in the region of 15:1).

The object of this invention is to produce fully expanded aggregate with minimum fuel consumption in apparatus of lower capital cost than standard rotary kilns. That is to say to eliminate the disadvantages described in (i), (ii) and (iii) above.

According to the invention a method of heat treatment of expansible material to form lightweight aggregate is proposed using a rotary kiln which is inclined downwardly from its charge end to its discharge end and has a maximum length to breadth ratio of 5:1, said method comprising heating the interior space of the kiln by means of at least one burner directed into the kiln from one end thereof to a substantially constant elevated process temperature and feeding the material into the kiln so that it occupies a maximum of 10% of the cross-sectional area of the interior space of the kiln at the charge end so that upon entering the kiln the material is subjected almost immediately to said process temperature, heat transfer to the material as it moves along the bottom of the kiln from the charge to the discharge end thereof being primarily by radiation from the combustion space and from the lining of the kiln and by direct contact with the lining of the kiln.

Advantageously, heating may be achieved by at least one pair of regenerative burners directed into the respective ends of the furnace.

Thus, according to the invention a process is proposed whereby a rotary kiln is adapted and used in a manner characterised as follows:

(a) The length to breadth ratio is reduced to a maximum of 5:1 so that heating means in the form of burners (with attendant flues and/or eductors as appropriate) at the discharge end, or the feed end, or at both ends enable the temperature along the whole kiln length to be maintained at an elevated process temperature. Such burners can be adjusted independently to bring about an isothermal chamber.

(b) At feed, material, whether preheated or not, is immediately subjected to the said elevated temperature.

(c) The feed rate of material is restricted so that at the feed station, in section, the feed occupies less than 10% of the total sectional area.

Transit time of material through the kiln is determined by a combination of the angle of inclination of the kiln to the horizontal and the speed of rotation. Preferably it is less than 20 minutes, usually less than 10 minutes.

For any chosen transit time, there is a maximum loading of material within the kiln that can be successfully treated. Loading can be gauged by reference to the kiln in section just after feed and the percentage sectional area occupied there by the unexpanded material (occupancy). The shorter the transit time the less is the occupancy that can be tolerated. Once the transit time is set, occupancy is then controlled by adjusting the feed rate. Generally the transit time is chosen to be of short duration say between 2 and 8 minutes and the feed rate is then adjusted to suit. This means that the occupancy at the feed station may be reduced to well below 10% to, say, between 2 and 5% of the sectional area and sometimes even less than this, particularly when cold feed is used. Constant high temperature treatment of small quantities in rapid transit through the kiln is the essence of the process.

The material under treatment is heated by radiation from a radiative combustion space which is large in volume compared to the charge and by the hot lining passing beneath. Heat transfer direct from combustion gases as takes place in a conventional rotary kiln is not intended and any such transfer is incidental.

Conditions within the kiln will involve the products of combustion leaving the kiln at high temperature, something approaching that of the process temperature. Heat is preferably recovered therefrom external to the kiln and is used to preheat the combustion air.

If it is desired to improve fuel economy (albeit at the expense of some expansion), the sensible heat contained in the hot product leaving the kiln may be used to preheat the feed material.

The kiln need not be strictly cylindrical, and could have a polygonal cross-section. Its length to breadth (or diameter) ratio is preferably between 2 and 4 to 1. For example, a typical ratio might be 2.5 in which case an internal furnace diameter of 1.5 m would be accompanied by a length of 3.75 m. The kiln is fired from either end or from both ends depending primarily on the length to breadth ratio chosen. In practice, these burners with attendant flues or eductors will be positioned towards the top of the furnace, i.e. approximately diametrically opposite the position adopted by the material charge passing through when the furnace is in motion so that the charge will be remote from the passage of combustion gases.

As the kiln rotates the material tumbles and progresses towards discharge and is systematically exposed to an intense radiant flux from the combustion reaction itself and from the kiln lining. It is also heated by direct contact with the hot kiln lining.

The short furnace length as proposed by the invention is aimed at keeping the furnace temperature constant along its length, as far as practicable. There may, however, be temperature reductions (acceptable ones) at the ends of the furnace due to heat losses at the discharge aperture and a general cooling upon admission of fresh material at the feed station. This cooling is minimised when at the feed station occupancy is kept small, e.g. below 5%, of the cross-sectional area of the kiln interior, typically 3%, but sometimes even less than this when material is fed in at ambient temperature.

Maintenance of a high temperature throughout the furnace, with the material being subjected to this immediately, or almost immediately it is fed in maximises expansion of the material particles. Gaseous products are trapped instead of being dissipated, as occurs during slower heating in the previously known apparatus/method. The outer surface reaches fusion in minimum time, before expansion gases from the interior can evolve and escape.

Also, because the furnace in accordance with the invention is short in length and compact, there is a substantial reduction in capital cost compared to a conventional rotary kiln.

Inherent in the expansion process is the need for the material to soften and start to fuse. In this state it becomes sticky and the individual particles start to stick together and form agglomerations and, more seriously, the material whether agglomerated or not sticks to the refractory lining of the kiln. This sticktion to the refractory lining is known as "ringing" and has the effect of preventing an orderly transit of material through the kiln and can even develop into a complete blockage.

To obviate such undesirable effects two courses of action are possible. One course is to slightly lower the temperature of operation (say by 25°–50° C. approximately) to prevent sticktion, but then the product leaving the kiln is not fully expanded. The other course is to add a cohesion inhibitor, in the form of a powdered or finely sized material which has a substantially higher melting point than the material under treatment. It is important that this additive does not promote liquid formation by the formation of a eutectic with the material under treatment. The use of fine fairly pure silica sand of granular size 200–500 microns is ideal. The quantity of sand that needs to be added will have to be determined by experiment, and will depend on the sort of product which is desired. If it is desired merely to permit material, whether agglomerated or not, to pass through the kiln, then only relatively small quantities of sand will need to be added (say 10% of the weight of the material being treated) and the material will need to be crushed and graded after treatment to produce aggregate of desired sizes from expanded material which has also perhaps agglomerated. On the other hand, if it is desired to produce expanded aggregate as individual particles each expanded in their own right then a larger proportion of sand will have to be added with the feed.

When using the method of the invention sand or a similar finely divided granular refractory material will probably need to be admixed with the feed, as a cohesion inhibitor, to minimize problems just outlined.

Such sand should preferably be separated from the product while hot and recirculated back to the furnace as hot as possible to enhance fuel efficiency.

As previously mentioned, one way of putting the invention into effect is to employ a complementary pair of regenerative burners as heating means with one burner of the pair being directed into the feed end and the other into the discharge end.

The use of a regenerative burner pair (which is possible because the furnace itself is so compact) allows combustion efficiency to be increased to something approaching 80% with fuel savings of about 50% compared to conventional burners. In use, at any one time one burner of the pair is operatively supplied with a chosen combustible fuel/air mixture and applies its heat to the furnace space. The products of combustion, after passing across the said space, are taken up by the complimentary burner and passed to equipment which serves to retain the accumulated residual heat contained in such combustion products. Upon the accumulated heat reaching a predetermined level, the roles of the two burners of the pair are reversed, with the previously accumulated heat each time serving to preheat the combustion air being supplied to the operative burner. With a furnace temperature of 1200° C. the combustion air can be preheated to 1000° C. using this system.

The combustion efficiency would be less than 40% using conventional burners, i.e. with cold air and no preheat at all.

Two arrangements, and results that can be achieved, will now be described with reference to the accompanying drawings in which:

FIG. 1 is a diagrammatic sketch of a kiln or furnace and associated equipment employed in a process in accordance with the invention; and FIG. 2 is a section along line A—A in FIG. 1; and FIG. 3 is a diagrammatic sketch of a modified arrangement of equipment which may be associated with a kiln similar to that shown in FIGS. 1 and 2 and employed in a modified process in accordance with the invention.

The terms kiln and furnace as used herein are intended to have identical meaning.

Referring to FIGS. 1 and 2, the furnace 10 is cylindrical and may have an internal diameter of 2 metres and a length of 5 metres, thus a length to diameter ratio of 2.5. Respective end walls 12, 14 are provided at the feed and discharge ends of the furnace 10 and respective burners B2 and B1 are mounted with their jets projecting through these end walls. As is clear from FIG. 2, the burner jets are mounted opposite each other in the upper regions of the side walls 12, 14, so as to face each other along the length of the furnace 10. They thus form a co-operating regenerative burner pair, and the flames and combustion products which, in use, issue alternately from one then the other do not impinge on the material being treated which travels along the bottom of the furnace.

The furnace 10 is downwardly inclined from its feed to its discharge end. The angle of inclination may be in the region of 5°. The cylindrical walling of the furnace 10 is rotatable relative to the end walls 12, 14 about its longitudinal axis. In this embodiment rotation is effected by the action of a driven toothed wheel 16 upon a similarly toothed thrust collar 17 which encircles the exterior of the furnace approximately centrally. For stability, the furnace is mounted upon two further pairs of passive rollers 18 towards each end thereof.

At the feed end, two feed channels or chutes 19, 20 are provided through the end wall 12, one (19) for the material to be expanded, which, for example, may be particles of slate and one (20) for an admix, for example of sand in the size range 200–500 microns, to minimize adhesion of the material under treatment to the furnace interior as previously explained. It is preferable to admit the sand prior to the slate, as shown, to maintain a lining of sand on the furnace walls.

At the discharge end of the furnace 10, an aperture in the end wall 14 leads into a sieve separator 22 for separation of sand from the expanded product.

In any practical embodiment, the angle of inclination to the horizontal and the speed of rotation of the cylindrical furnace 10 will be adjusted to promote an optimum degree of tumbling of the material so that there is no violence of motion. In this example, the material under treatment and the admix travel down the length of the cylinder in an orderly fashion in about 6 minutes. Furthermore, the rate of feed should be adjusted so that just after the material and admix enter the furnace 10 they occupy only about 4% of the cross-sectional area of the furnace. The admix will tend to fill up the voids between the individual pieces of particulate material being treated and will thus not add materially to the overall volume. A suitable amount of sand to be added might be 20% of the charge by weight. Thus every 1000 kg of particulate material will be accompanied by 200 kg of sand.

In use, the burners B1 and B2 operate alternately, as previously described, and because of the short length chosen for the furnace 10, their combustion gases raise the interior space of the furnace to a temperature of about 1200° C., which is substantially constant along the entire length, excepting for a slight inevitable lowering at the feed and discharge ends. As the material tumbles through the bottom region of the furnace, well below the passage of combustion gases between the burners, B1 and B2 it is rapidly heated, principally by an intense radiant flux from the space and lining above, and also from the hot lining of the furnace 10 passing beneath, to its fusion temperature, and it is thereby maximally expanded.

The use of a regenerative burner pair B1, B2 to achieve a substantially constant temperature along the furnace has the added advantages of fuel efficiency inherent in use of such burners.

After discharge, the sand is separated from the expanded slate product in the sieve separator 22, and to increase efficient use of fuel it can be recirculated hot, as indicated in FIG. 1. For example, it could be returned to the furnace at 600° C.

Also, the material fed into the furnace via channel 19 is preferably pre-heated, e.g. to 400° C., to reduce the lowering of the furnace temperature at the feed end and at the same time enhance the efficient use of fuel supplied to the furnace. This could readily be accomplished, as indicated in FIG. 1, by channelling hot air from a cooler 24, into which the product falls, to a rotary countercurrent heat exchanger 26, where it is used to pre-heat the cold particulate infeed material. The hot air will initially be at a temperature of about 700°–800° C. and it can be exhausted from the heat exchanger 26, via a cyclone, through a stack (neither of which are shown).

Another particularly effective way of transferring heat from the hot product to preheat the infeed material, is again to use air as a transfer medium, but within two rotary cylindrical vessels arranged in tandem. The method and apparatus associated with this are best explained by reference to FIG. 3.

Rotary cylinders 2 and 4 are lined with heat resistant insulating material and are rotatable about their longitudinal axes which are inclined by a few degrees to the horizontal. Each cylinder is supported by rollers 6 which can for each cylinder be driven independently i.e. each cylinder can be rotated independently each at selected speed. Thrust collars and rollers are provided to keep the cylinders 2 and 4 in position axially—these are not shown in the drawing.

Each cylinder acts as a countercurrent heat exchanger. Hot product direct from the kiln 10 is fed in to cylinder 2 by chute 8 at a temperature of 1000° C. approximately after having been cleansed of sand. Air is blown along the cylinder 2 by forced draught fan 40. The cylinder 2 is longer than shown (see break in sketch) and is fitted with baffle means to tumble the material in the air flow and assist heat transfer. By the time the air reaches the charge end of the cylinder 2 it will have been heated to a temperature of about 700° C. and when the product reaches the discharge end it will have been cooled. Air mass flow rate is chosen carefully to balance solids mass flow rate for maximum extraction of heat. Air velocities are kept relatively low.

The other cylinder 4 acts in a similar way but the heat flow is reversed. Again, it is longer than shown (see break in sketch). At the cool end, which is the feed end, incoming feed material is fed via chute 42 and this material progresses down towards the hot end, again in countercurrent, meeting progressively hotter air until discharge. Again baffle means are provided to assist heat transfer. This cylinder 4 has a larger length to diameter ratio than the cylinder 2 and air velocities within it are thereby increased. Higher air velocities will carry away dust, but as the particles are unexpanded and of normal density the particulate material in transit will be able to stand comparatively high air velocities without ill effects—such as being blown backwards. (In cylinder 2 high velocities cannot be tolerated as the expanded product is blown along quite easily).

At the cool end of cylinder 4 the blown air originating from fan 40 is exhausted by fan 44 through cyclone 46.

Sealing arrangements for the cylinders 2 and 4 are important in achieving high thermal efficiency.

At the forced draught end, seal 45 will probably be radial, possibly with lightly loaded brushes pressing on the cylinder 2 externally. If there is leakage outward it will be of air that is quite cold and heat losses will not be particularly significant. At the product outlet the product itself provides a form of closure or seal by virtue of mound 48 which protrudes upwards into discharge duct 50. As a result, most of the forced draught air from fan 40 will be constrained to flow along the cylinder 2.

At the other end, the exhaust, there is a seal 52 of similar form to the seal 45. At this seal the space within will be under a negative pressure under the influence of exhaust fan 44. Any air leaking in will merely dilute the exhaust air temperature and is of no consequence thermally.

In the centre are two seals 54 one for each cylinder 2, 4 and these are important as hot air leaking out, or cold air leaking in will lead to serious heat losses. The seals will probably be radial and of similar form to seals 45 and 52. To keep leakage to an absolute minimum in this hot zone, the pressure differential between internal pressure and atmospheric is kept to a minimum. By adjusting fans 40 and 44 by means of speed control or by dampers it is possible to adjust the internal pressure in space 56 to atmospheric or very near. Space 56 communicates with the main furnace and sand stripper and it is important also to avoid any significant air flow within chute 8 in either direction. Under the influence of one fan alone, space 56 would be under either positive or negative pressure relative to atmospheric—with attendant undesirable effects.

Centrally below the space 56 preheated material is collected and stored in a highly insulated vessel 60 with sluice valves 62 at top and bottom. Preheated material at 400°–500° C. can then be transported within the vessel 60 and similar vessels to the feed section chute on the main kiln. Whilst changing vessels the sluice 62 at the bottom of the lower conical portion 58 of the space 56 is closed so material can collect in the portion 58 while a replacement empty vessel 60 is connected. Once connected, the sluice 62 is re-opened and the collected material freely falls into the vessel 60 to be followed by a stream of material direct from the cylinder 4.

The above method achieves good thermal efficiency with preheat to 400°–500° C. being possible, thereby enhancing fuel efficiency of the process as a whole considerably.

Exemplary operating figures are as follows:

The weight of material contained within the furnace 10 at any one time may be approximately 0.7 tonnes, and with a residence time of 6 minutes this equates to 7 tonnes per hour. Using the regenerative burners at an assumed efficiency of 78%, heat losses at 15% and with feed and admix added preheated, as just described, the energy needed will be in the order of 280,000 kilo-calories per tonne. This represents a substantial improvement in efficiency over conventional rotary kilns.

The bulk density of exanded aggregate produced from e.g. 10 mm slate chippings or clay/slate pellets will be in the order of 380 kg per cubic metre.

In FIG. 1, after the cooler 24, the expanded product can pass, at a temperature reduced to about 200° C., to a grading unit 28, which may include a crusher, to provide a size graded product. The cooled product 48 in FIG. 3 may be dealt with in a similar manner.

In a second example of the method of the invention there is no preheating of material before treatment in the kiln. This maximises possible expansion and produces an ultra lightweight product with even better insulating properties. The weight of material within the furnace at any one time may be approximately 0.25 tonnes, corresponding to an occupancy at feed of 1½% of the sectional areas of the kiln. With a residence time of 3½ minutres this equates to 4.3 tonnes per hour. If regenerative burners are again used with an assumed efficiency of 78% and with heat losses at 15% and with admix only preheated as previously described, the energy needed will be in the order of 400,000 kilocalories per tonne. The bulk density of the resulting aggregate will be less than with the first described method for the same size of original feed particles, usually 300 kg per cubmic metre or less. In this method (without preheat), after passing through the sieve separator 22 a different disposal route can be used, if desired, by passing the cooling/preheat arrangements as shown.

It must be emphasised that the precise details and figures given in the foregoing description and shown in the accompanying diagram are only by way of example, so that the invention can be better understood. Many variations are possible without departing from the principle features of the invention, namely the provision of a furnace which is of much shorter length than hitherto and is heated from one or both ends so as to achieve almost an isothermal chamber. By limiting the infeed volume of material, but having the material pass through rapidly, the degree of product expansion achieved is maximized. Furthermore, considerable fuel efficiencies are possible by using the heat contained in the flue gases to preheat the combustion air. Many methods of doing this are known. Additional measures such as those described in the example to preheat the feed can be taken to further improve the efficient use of fuel supplied.

Specific details which may vary in other embodiments include the means of rotation of the furnace, which could, for example be achieved by gear teeth around the exterior intermeshing with a drive gear, and the admix material which may be any suitable inert granular material of appropriate size.

The method of the invention is not solely confined to the heat treatment of clays, shales and slates, but it can be applied to any rock type that is capable of being expanded by heat treatment. When the feed is in the form of pellets made from finely ground material, it is possible in the manufacture of such pellets to admix gas producing agents to improve expansive properties. Such agents are usually carbonaceous and typically limestone in finely powdered form can be added in small quantities. This can be useful where the inherent expansive properties of a feed material are low.

What is claimed is:

1. A method for heat treating expansible material to form lightweight aggregate in a rotary kiln having a heated interior space of a length, breadth and cross-sectional area defined by a kiln lining, and which is inclined downwardly from a charge end to a discharge end, comprising the steps of:

a) providing a kiln having a maximum ratio of said length to said breadth of 5:1;

b) heating said interior space by means of at least one burner directed into said interior space from at least one end of said kiln, said interior space being heated thereby to a substantially constant elevated process temperature, said temperature being substantially constant along said length;

c) passing expansible material from the charge end to the discharge end along the length of said heated interior space, said material occupying a maximum of 10% of the cross-sectional area at the charge end and being subjected almost immediately to said process temperature upon entering the interior space, with heat being transferred to the material as it moves along said length primarily by radiation from the heated interior space and the kiln lining and by direct contact with the kiln lining, whereby said material is heated to incipient fusion in passing from the charge end to the discharge end, producing gas which is trapped internally, to form said thereby said lightweight aggregate.

2. A method as claimed in claim 1 wherein the interior space of the kiln is heated by means of burners directed, respectively into the charge end and into the discharge end of the kiln.

3. A method as claimed in claim 2 wherein the burners comprise a pair of regenerative burners, which operate alternately.

4. A method as claimed in claim 1 wherein the at least one burner is positioned towards a top portion of the kiln.

5. A method as claimed in claim 1 wherein the kiln is rotated at a speed of rotation and inclined downwardly at an angle chosen so that the material passing therethrough has a transit time of less than 20 minutes.

6. A method as claimed in claim 5 wherein the transit time for material passing through the kiln is less than 10 minutes.

7. A method as claimed in claim 6 wherein the transit time for material passing through the kiln is 6 minutes or less.

8. A method as claimed in claim 1 where heat is recovered from flue gases external to the kiln and is used to preheat combustion air.

9. A method as claimed in claim 1 wherein heat is recovered from lightweight aggregate leaving the discharge end of the kiln and is used for preheating material to be fed into the charge end of the kiln.

10. A method as claimed in claim 9 wherein lightweight aggregate leaving the discharge end of the kiln is fed through a first, downwardly inclined rotary cylinder in countercurrent with cooling air, which air is then passed through a second, upwardly inclined rotary cylinder in countercurrent with feed material to effect preheating thereof.

11. A method as claimed in claim 10 wherein the first and second cylinders are arranged with a feed end of the first cylinder substantially in alignment with the discharge end of a second cylinder so that a stream of air which cools the lightweight aggregate and subsequently heats the feed material readily flows from the first to the second cylinder.

12. A method as claimed in claim 10 wherein the discharge end of the first cylinder is closed off by an accumulation of cooled product in order to maintain adequate air flow rate through the respective cylinders.

13. A method as claimed in claim 1 wherein sand is fed into the kiln along with the material to be treated.

14. A method as claimed in claim 13 wherein hot sand is recovered from the lightweight aggregate leaving the discharge end of the kiln and is reused while hot for feeding at the charge end of the kiln.

* * * * *